(12) United States Patent
Schönfeld et al.

(10) Patent No.: US 8,021,463 B2
(45) Date of Patent: *Sep. 20, 2011

(54) METHOD FOR PRODUCING SPHERICAL ACTIVATED CARBON

(75) Inventors: Manfred Schönfeld, Roβlau (DE); Raik Schönfeld, Hannover (DE)

(73) Assignee: Blucher GmbH (DE)

( * ) Notice: Subject to any disclaimer, the term of this patent is extended or adjusted under 35 U.S.C. 154(b) by 429 days.

This patent is subject to a terminal disclaimer.

(21) Appl. No.: 11/990,426

(22) PCT Filed: Aug. 10, 2006

(86) PCT No.: PCT/DE2006/001420
§ 371 (c)(1),
(2), (4) Date: Feb. 19, 2009

(87) PCT Pub. No.: WO2007/019831
PCT Pub. Date: Feb. 22, 2007

(65) Prior Publication Data
US 2009/0158927 A1     Jun. 25, 2009

(30) Foreign Application Priority Data

Aug. 12, 2005   (DE) .......................... 10 2005 038 555

(51) Int. Cl.
*B01D 53/02*   (2006.01)
(52) U.S. Cl. ..................... 95/90; 423/445 B; 423/447.2; 502/418; 502/423; 502/432

(58) Field of Classification Search ...... 95/90; 502/418, 502/423, 432; 423/445 B, 447.2
See application file for complete search history.

(56) References Cited

U.S. PATENT DOCUMENTS

| 4,957,897 A | | 9/1990 | Maroldo et al. | |
| 5,904,852 A | * | 5/1999 | Tour et al. ..................... | 210/635 |
| 2004/0126303 A1 | * | 7/2004 | Hwang ........................ | 423/447.2 |
| 2004/0202603 A1 | * | 10/2004 | Fischer et al. ............. | 423/447.2 |
| 2006/0148645 A1 | * | 7/2006 | Schonfeld et al. ........... | 502/416 |
| 2008/0118425 A1 | * | 5/2008 | De Ruiter ................... | 423/447.2 |
| 2010/0263531 A1 | * | 10/2010 | Schonfeld et al. ................. | 95/90 |

FOREIGN PATENT DOCUMENTS

| DE | 196 53 238 A1 | 6/1998 |
| EP | 0 326 271 B1 | 5/1992 |
| EP | 0 814 056 A1 | 12/1997 |
| WO | 96/21616 A1 | 7/1996 |
| WO | 99/28234 A1 | 6/1999 |
| WO | 01/02295 A1 | 1/2001 |
| WO | 01/83368 A1 | 11/2001 |
| WO | 2004/046033 A1 | 6/2004 |
| WO | 2005/016819 A1 | 2/2005 |

* cited by examiner

*Primary Examiner* — Robert J Hill, Jr.
*Assistant Examiner* — Christopher P Jones
(74) *Attorney, Agent, or Firm* — Mayer & Williams PC

(57) ABSTRACT

The invention relates to a method for producing spherical activated carbon, wherein polymer globules, which comprise thermally decomposing chemical groups, are carbonized. It is characterized by that during the carbonization, a supplier of free radicals is added to the polymer globules, the supplier of free radicals forming free radicals, which are different from the free radicals that are generated by the decomposition of the chemical groups.

11 Claims, No Drawings

METHOD FOR PRODUCING SPHERICAL ACTIVATED CARBON

FIELD OF THE INVENTION

The invention relates to a method for producing spherical activated carbon, wherein polymer beads comprising thermally decomposing chemical groups are carbonized, to an a spherical activated carbon obtained by such a method and to the uses of such activated carbons. Spherical activated carbons in the meaning of the invention are activated carbon particles with essentially similar extensions in all three spatial dimensions. Besides the spherical shape, thus also the cubical, parallelepiped or cylindrical shapes are imaginable, as far as the extensions in two different spatial dimensions do not differ by more than a factor 3, better less than a factor 2.

BACKGROUND OF THE INVENTION AND PRIOR ART

Besides applications, wherein classical activated carbons are used as a mass product, applications requiring special high-performance activated carbons are becoming increasingly important. These are applications, wherein the required amounts of activated carbon for a certain purpose and a certain time of use have to be kept low, and nevertheless excellent adsorption properties (adsorption kinetics, capacity) are required. These are in particular mobile applications, such as for filters in vehicles (cars, aircrafts, etc.) or in gas masks, but also in building air filters. Besides a favorable capacity/weight ratio, other requirements also play a role, such as a low pressure loss over a filter containing the activated carbon. This also means, however, that it is not always possible for in so far additional requirements to use activated carbons maximized with regard to the BET surface; rather, it may be necessary to use activated carbons, which in spite of a moderate BET surface have nevertheless outstanding adsorption properties. In any case, excellent adsorption properties are required, in particular in the case of filters, which are intended to protect persons from toxic gases. In addition, it is desired that a spherical activated carbon is particularly abrasion resistant.

From the document EP 0 326 271, a method for producing an activated carbon is known in the art, which can be prepared from a polysulfonated copolymer. The obtained activated carbon has a multimodal pore size distribution, i.e. a high share of mesopores and macropores.

From the document WO 96/21616, a method for producing an activated carbon from monosulfonated copolymers is known in the art.

From the document WO 99/28234, a method for producing an activated carbon from styrene-divinylbenzene copolymers is known in the art, and by variation of parameters of the method, the pore size distribution can be adjusted in a wide range.

From the document U.S. Pat. No. 4,957,897, a method for producing an activated carbon from a polysulfonated vinylaromatic copolymer is known in the art, wherein the carbonization is effected under dissociation of sulfonic acid groups.

From the document WO 2004/046033, a spherical activated carbon is known in the art, which has an improved pore size distribution.

The educt often used in the above methods is a fresh or spent ion exchanger of a spherical shape. This is a (co)polymer, which carries chemically active groups, for instance sulfonic groups, and has a porous structure or a gel structure. The man skilled in the art knows such ion exchangers from the practice.

All above prior art methods for the production of activated carbons have the common drawback that the absorption properties and the abrasion resistance do not yet meet the highest requirements. In particular the individual grain load can also be improved.

TECHNICAL OBJECT OF THE INVENTION

It is the technical object of the invention to provide a method for producing a spherical activated carbon, which is improved with regard to the individual grain load, the absorption properties and the abrasion resistance.

BASICS OF THE INVENTION AND PREFERRED EMBODIMENTS

For achieving this technical object, the invention teaches that during the carbonization a supplier of free radicals, in particular free oxygen radicals, is added to the polymer globules. In other words, during the carbonization so to speak externally produced free radicals are actively added, i.e. free radicals, which due to the active addition are available for the reactions of the carbonization in addition to the free radicals anyway generated during the carbonization. It is preferred that the supplier of free radicals forms free radicals, which are different from the free radicals that are generated by the decomposition of the chemical groups.

The invention is based on the finding that during the carbonization hydrocarbons are mobilized and leave the pore system after diffusion therethrough. It is however essential that diffusing hydrocarbons do not condensate to an appreciable degree in the pore space. By such condensation processes, the pore structure, in particular the pore size distribution, is adversely affected during the carbonization. For reasons of the absorption capacity, in particular of the BET surface, desirable micropores (pore diameter 0 to 4 nm) are blocked. For preventing or reducing such condensation processes, according to the invention free radicals are generated by addition of a supplier of free radicals, for instance by thermal decomposition of the suppliers reacting with the mobilized hydrocarbons of the gas phase and oxidizing them, so that a condensation cannot take place anymore.

Preferably, the carbonization is performed in a precarbonization step and a subsequent final carbonization step, and the supplier of free radicals may be introduced in the final carbonization step into the carbonization atmosphere.

As suppliers of free radicals may in particular be used those, which form oxygen radicals during the (thermal) decomposition or during degradation. Examples are organic hydroperoxide, per-acid, per-acid ester, diacylperoxide, ketonperoxide, epidioxide and peroxide compounds, $H_2O_2$, permanganate, ortho-phosphoric acid, or $P_2O_5$. Preferably $H_2O_2$ is used. A water-soluble supplier of free radicals is preferably injected in an aqueous solution into the carbonization atmosphere. Non-water-soluble liquid organic suppliers can directly be injected.

When using $H_2O_2$, the application of an aqueous solution of a concentration from 5 to 50 wt.-%, preferably 5 to 30 wt.-%, $H_2O_2$ is preferred. Further, an amount of $H_2O_2$ solution from 50 to 500 g, preferably 150 to 300 g, referred to 1 kg employed polymer globules, is preferred. When using ortho-phosphoric acid, a concentration of the aqueous solution from 1 to 20 wt.-%, in particular 1 to 10 wt.-% is preferred. Per kg employed polymer globules then 50 to 500 g, preferably 100 to 250 g, of the solution can be injected.

By means of the method according to the invention, the employed polymer globules can for instance be produced from a polystyrene (co)polymer, polyacryl(co)polymer, polyalkylamin(co)polymer or phenol-formaldehyde resin, preferably from a sulfonated copolymer of styrene with divinylbenzene or with acrylic acid, in particular an ion exchanger of the gel type or a macroporous ion exchanger. These may also be spent ion exchangers, non-spent ion exchangers are however preferred. Ion exchangers of the gel type typically comprise approx. 2 to 10%, in particular 4 to 9%, divinylbenzene monomers (weight portion monomer related to the total amount monomers). The thermally decomposing chemical groups of the employed polymer globules are then typically sulfonic acid groups, so-called homologs, such as hydrocarbon radicals and compounds, and aromatic hydrocarbon radicals and compounds. Commercially available ion exchanger globules typically have a diameter from 0.2 to 2 mm, in particular from 0.4 to 1 mm, and lead to spherical activated carbons with a diameter in the range from 0.1 to 1.8 mm diameter, in particular 0.3 to 0.8 mm diameter.

In detail, the method according to the invention can be carried out as follows.

Before the carbonization, the polymer globules can be treated with $SO_3$ gas, preferably at temperatures between 273 K and 573 K, in particular between 293 K and 443 K, and in a pressure change between −1 bar and 10 bar, in particular between −1 bar and 5 bar, referred to atmospheric pressure. Thereby, a complete residual drying of the polymer is achieved before the further attachment of sulfonic groups. Further, the existing sulfonic groups are dehydrated. Finally, another attachment of sulfonic groups to a partial polysulfonation is carried out.

After the treatment with $SO_3$ gas and before the carbonization, the polymer globules can be treated with concentrated sulfuric acid or oleum, preferably in a mass ratio of 1 part by weight acid to 0.5 to 10 parts by weight, in particular to 1 to 3 parts by weight, polymer globules and in the temperature range from 273 K to 573 K, in particular from 400 K to 550 K. The concentrated sulfuric acid may have a concentration (moles $SO_3$/moles $H_2O$) from 60% to 100%, in particular 80% to 98%. In the case of the oleum, the share of free $SO_3$ (referred to moles of 100% sulfuric acid) can be in the range from 1% to 35%, in particular 1% to 25%. In this step, a peptization is achieved, i.e. monomer, dimer and oligomer residues are separated and then attached on the surface of the particles. These attachments form in the subsequent carbonization a very hard and thus abrasion resistant pseudo graphite layer on the surface of the particles.

The pre-carbonization step can be carried out in a temperature range from at least 373 K as starting temperature to max. 673 K as final temperature, within the temperature range with a heating-up gradient from 0.5 K/min to 5 K/min, in particular 1 K/min to 3 K/min, and in an inert or oxidizing atmosphere. The starting temperature can be in the range from 373 K to 523 K, in particular 453 K to 523 K. The final temperature can be in the range from 533 K to 673 K. The temperature program of this step is given by the starting temperature, the subsequent heating-up process with the given heating-up gradient and the achieved final temperature. As inert gases can be used for instance nitrogen or argon. An oxidizing atmosphere can for instance be produced by addition of oxygen or air to the inert gas. The share of oxygen or air (referred to the volume) in the inert gas may be 1% to 10%, in particular up to 5%, the statement not comprising oxygen from the peroxide decomposition.

The final carbonization step can be performed in a temperature range from at least the final temperature of the pre-carbonization to maximum 1073 K to 1273 K and within the temperature range with a heating-up gradient of 2 K/min to 40 K/min, in particular 10 K/min to 25 K/min.

Subsequently to the final carbonization, an activation step can be carried out. It can be performed according to prior art, the parameters in detail being chosen according to the desired pore structure. Typically the activation takes place at temperatures from 900 K to 1,200 K under addition of 1 to 30% (referred to the mole share) water vapor and/or $CO_2$ to the inert gas or rinse gas. In the case of the $CO_2$, an upper limit of 10% is preferred.

A spherical activated carbon according to the invention can for instance be used in means for filtering gases, in particular air filters and gas masks or gas protection dresses. Further applications are: gas separation, gas storage, latent heat exchangers, filter systems in air-conditioning, in particular also in the intake area for the adsorption of toxic gases involuntarily set free in the intake area, carriers for pharmaceutical active substances and catalysis, for instance by means of activated carbons coated with a catalytically active substance. In these applications, the activated carbon particles are applied and fixed on a carrier material and/or embedded therein. The carrier material is then subjected to gas flow to be cleaned. In the case of the carriers for pharmaceutical active substances, the activated carbon particles are loaded with the active substance and then galenically prepared in a usual way.

In the following, the invention is explained in more detail with reference to examples representing embodiments only.

EXAMPLE 1

Production of a Spherical Activated Carbon with the Use of $H_2O_2$

A strongly acid, gel-type cation exchanger of sulfonated styrene-divinylbenzene copolymerisate in H form is used, the Matrix being cross-linked with approx. 10% divinylbenzene share, in spherical shape and a particle size (diameter) of 1 mm. This commercially available product (C100×10H, Purolite) is first washed three times with de-ionized water (30 min, 40° C.). After washing, a centrifugation in vacuum (8,000 g, 10 min, 10 mbar) to a residual moisture of less than 5 wt.-%, preferably less than 2.5 wt.-%, water takes place.

Then follows a treatment of the polymer in a discontinuous reactor with $SO_3$ gas. 25 pressure changes between −1 bar and 5 bar are performed. The polymer globules heat up to a temperature in the range from 293 K to 443 K due to the exothermal reaction of the residual water with $SO_3$.

Then follows in a discontinuous reactor a treatment of the polymer globules with oleum (3% free $SO_3$) in a mass proportion of 1:1.75 (acid to polymer globules). A temperature of the polymer globules of approx. 493 K is adjusted. In this step there is no additional sulfonation of the polymer. It is a pure leaching step, in which hydrocarbon monomers, dimers and oligomers are mobilized and deposited on the surfaces of the globules.

Then follows the pre-carbonization in the same reactor and in a argon atmosphere, to which are added 3 vol.-% oxygen (technical purity).

Beginning at 493 K, a temperature of 573 K is adjusted with a heating-up gradient of 2 K/min. Thereby, nearly all sulfur is separated from the globules and driven out.

Thereafter is then made in the same reactor the final carbonization. Thereby, practically no sulfur is released anymore, so that a sulfur waste gas purification can be left out in this step. Beginning at 573 K, a temperature of 1,193 K is adjusted with a heating-up gradient of 12 K/min. Approx. every 3 min, a 10% $H_2O_2$ aqueous solution is injected into the gas space directly from a cooled supply line. Overall, 200 g solution per kg polymer globules are injected, and the injection of the total amount extends nearly uniformly over the heating-up time.

Then follows an activation at 1,193 K in an inert gas atmosphere. The pyrolyzed globules are held on the mentioned temperature in an activation gas atmosphere (Ar 65 vol.-%, $CO_2$ 7 vol.-%, $H_2O$ 28 vol.-%) for 240 min.

The obtained spherical activated carbon particles have a diameter of approx. 0.55 mm. A spherical activated carbon with a high micropore share and comparatively very small mesopore and macropore share and with a very high fractal dimension is obtained.

As BET surface results a value of approx. 1,400 $m^2/g$. For the pore size distribution the following values are obtained: 1.2-1.7 nm: approx. 35%, 1.7-2.1 nm: approx. 38%, 2.1-2.5 nm: approx. 13%, 2.5-2.9 nm: approx. 4%, 2.9-3.3 nm: approx. 3% (remainder outside the mentioned diameter ranges). The pores<4 nm represent approx. 97% of the total (open) pore volume. As value for the fractal dimension D=2.956 was obtained. With regard to the employed measurement methods, explicitly reference is made to the document WO 2004/046033 A1.

The abrasion resistance, measured according to the ball pan method (see ASTM D 3802), is 100%.

The individual grain load or the burst pressure is on average approx. 2,000 g/grain with maximum values up to 3,000 g/grain. The measurement of the burst pressure was made as follows. A grain sample was placed on a plate of a measuring device, which comprises the horizontally arranged plate and a vertically held pressure plunger. The pressure plunger was carefully lowered on the grain sample, and water was slowly and carefully filled into a water container provided at its upper end, until the grain had burst. Then the pressure plunger with the filled-up water container was weighed; this was then the obtained value. Always at least grain samples were measured, and from the obtained values the arithmetic mean value was calculated.

EXAMPLE 2

Production of a Spherical Activated Carbon with the Use of Other Suppliers of Free Radicals The procedure corresponds to that of Example 1, during the final carbonization ortho-phosphoric acid being however used instead of the $H_2O_2$ solution as a supplier of free oxygen radicals. The concentration is 5 wt.-%. The injected amount is 200 g per kg employed polymer globules.

The obtained product is practically identical with the product obtained in Example 1.

The invention claimed is:

1. A method for producing spherical activated carbon, wherein polymer globules, which comprise thermally decomposing chemical groups, are carbonized, wherein during the carbonization, a supplier of free radicals is added to the polymer globules, wherein the supplier of free radicals is selected from the group consisting of organic hydroperoxide, per-acid ester, ketonperoxide, diacylperoxide, epidioxide and peroxide compounds, $H_2O_2$, permanganate, ortho-phosphoric acid, or $P_2O_5$.

2. The method according to claim 1, wherein the employed polymer globules are produced from polystyrene(co)polymer, polyacryl(co)polymer, polyalkylamin(co)polymer, phenol-formaldehyde resin, or sulfonated copolymers of styrene with divinylbenzene or with acrylic acid.

3. The method according to claim 1, wherein the thermally decomposing chemical groups of the employed polymer globules are sulfonic acid groups.

4. The method according to claim 1, wherein the polymer globules are treated before the carbonization with $SO_3$ gas, at temperatures between 273 K and 573 K and in a pressure change between −1 bar and 10 bar, referred to atmospheric pressure.

5. The method according to claim 1, wherein the polymer globules are treated before the carbonization with concentrated sulfuric acid or oleum.

6. The method according to claim 1, wherein the carbonization is carried out in a pre-carbonization step and a subsequent final carbonization step, wherein the supplier of free radicals is introduced in the final carbonization step into the carbonization atmosphere.

7. The method according to claim 6, wherein the final carbonization step is carried out in a temperature range from at least the final temperature of the pre-carbonization to maximum 1,273 K and within the temperature range with a heating-up gradient of 2 K/min to 20 K/min.

8. The method according to claim 6, wherein subsequent to the final carbonization step an activation step is carried out.

9. The method according to claim 1, wherein the supplier of free radicals is $H_2O_2$.

10. The method according to claim 1, wherein a water-soluble supplier of free radicals in an aqueous solution is injected into the carbonization atmosphere.

11. The method according to claim 6, wherein the pre-carbonization step is carried out in a temperature range from at least 373 K as starting temperature to maximum 673 K as final temperature, within the temperature range with a heating-up gradient of 0.5 K/min to 5 K/min and in an inert or oxidizing atmosphere.

* * * * *